US010796289B2

(12) United States Patent
Park et al.

(10) Patent No.: US 10,796,289 B2
(45) Date of Patent: Oct. 6, 2020

(54) PRINTOUT DELIVERY SYSTEM AND METHOD USING MOBILE DEVICE

(71) Applicant: HEWLETT-PACKARD DEVELOPMENT COMPANY, L.P., Spring, TX (US)

(72) Inventors: Jeong-jin Park, Yongin-si (KR); Ki-young Hwang, Suwon-si (KR); Yong-chan Kwon, Anyang-si (KR); Kwang-seuk Kim, Suwon-si (KR); Jung-mi Kim, Seoul (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 603 days.

(21) Appl. No.: 15/485,566

(22) Filed: Apr. 12, 2017

(65) Prior Publication Data

US 2017/0308874 A1 Oct. 26, 2017

(30) Foreign Application Priority Data

Apr. 20, 2016 (KR) ........................ 10-2016-0048168

(51) Int. Cl.
*G06Q 40/00* (2012.01)
*G06Q 20/10* (2012.01)
(Continued)

(52) U.S. Cl.
CPC ........... *G06Q 20/10* (2013.01); *G06F 3/1203* (2013.01); *G06F 3/1236* (2013.01);
(Continued)

(58) Field of Classification Search
CPC ........ G06Q 40/00; G06Q 20/12; G06Q 20/10; G06Q 20/145; G06F 3/1236; G06F 3/20;
(Continued)

(56) References Cited

U.S. PATENT DOCUMENTS 9,706,331 B2 * 7/2017 Banno ..................... H04W 4/00
9,753,684 B1 * 9/2017 Najari ................... G06F 3/1272
(Continued)

FOREIGN PATENT DOCUMENTS

WO   WO 2015/020451 A1   2/2015

OTHER PUBLICATIONS

US 9,571,674 B2, 02/2017, Park et al. (withdrawn)
(Continued)

*Primary Examiner* — Lalita M Hamilton
(74) *Attorney, Agent, or Firm* — Staas & Halsey LLP

(57) ABSTRACT

A method of transmitting contents stored in a mobile device may include displaying a list of the contents on a display screen, receiving a user input for selecting content to be printed, on the display screen, displaying a list of printers capable of printing the selected content, and a 'send to delivery server' item on the display screen, transmitting the content to a cloud server based on a user input for selecting the 'send to delivery server' item on the display screen, displaying a printing cost of the content on the display screen while the content is being converted into print data by the cloud server, receiving payment information of the printing cost and receiver information of a printout of the content, and transmitting the payment information and the receiver information to the cloud server.

16 Claims, 16 Drawing Sheets

(51) Int. Cl.
    *G06Q 20/12*     (2012.01)
    *H04N 1/00*     (2006.01)
    *G07F 17/26*     (2006.01)
    *G06Q 20/14*     (2012.01)
    *G06Q 20/32*     (2012.01)
    *G06F 3/12*     (2006.01)
    *H04L 29/08*     (2006.01)
    *H04L 29/06*     (2006.01)

(52) U.S. Cl.
    CPC .......... *G06F 3/1268* (2013.01); *G06F 3/1286* (2013.01); *G06Q 20/12* (2013.01); *G06Q 20/145* (2013.01); *G06Q 20/3223* (2013.01); *G07F 17/266* (2013.01); *H04L 67/10* (2013.01); *H04L 67/42* (2013.01); *H04N 1/00132* (2013.01); *H04N 1/00244* (2013.01); *H04N 1/00307* (2013.01); *H04N 2201/0094* (2013.01)

(58) Field of Classification Search
    CPC ..... G07F 17/266; G07F 3/1286; H04L 67/10; H04L 67/42; H04N 1/00132; H04N 1/00244; H04N 1/00307; H04N 2201/0094
    See application file for complete search history.

(56) References Cited

U.S. PATENT DOCUMENTS

| | | | |
|---|---|---|---|
| 2004/0185882 A1 | 9/2004 | Gecht et al. | |
| 2005/0128968 A1* | 6/2005 | Yang | H04W 48/16 370/312 |
| 2009/0021776 A1* | 1/2009 | Dolan | G06F 3/1222 358/1.15 |
| 2010/0309510 A1* | 12/2010 | Hansen | G06F 3/1203 358/1.15 |
| 2013/0085968 A1 | 4/2013 | Schultz et al. | |
| 2015/0029541 A1 | 1/2015 | Yun | |
| 2015/0092233 A1 | 4/2015 | Park et al. | |
| 2015/0124278 A1* | 5/2015 | Juchem | G06Q 20/40 358/1.14 |
| 2016/0055477 A1* | 2/2016 | Guerin | G06Q 20/202 705/21 |
| 2016/0063477 A1* | 3/2016 | Egan | G06Q 20/327 455/406 |
| 2016/0085489 A1* | 3/2016 | Hansen | G06F 3/1204 358/1.15 |
| 2016/0171486 A1* | 6/2016 | Wagner | G06Q 20/12 705/39 |

OTHER PUBLICATIONS

"MDCT Coding mode decoding", 3GPP TS 26.445 V12.0.0, Release 12, Sep. 2014, pp. 520-606.
International Search Report, PCT/ISA/210, dated Jun. 30, 2017, in corresponding International Patent Application No. PCT/KR2017/003855.
Written Opinion of the International Searching Authority, PCT/ISA/237, dated Jun. 30, 2017, in corresponding International Patent Application No. PCT/KR2017/003855.
Notification of Transmittal of the International Search Report and the Written Opinion of the International Searching Authority, PCT/ISA/220, dated Jun. 30, 2017, in corresponding International Patent Application No. PCT/KR2017/003855.
Extended European Search Report dated Jun. 30, 2017, in corresponding European Patent Application No. 15759308.8.

* cited by examiner

< Payment
                         Mobile Payment

Product Name   xxx xx
Product Price   ₩ xx
Payment Date   2016-01-12

• Mobile Carrier  [SKT] [KT] [LG U] [Others ▼]
• Mobile Phone No. [010▼]-[    ]-[    ]
• First 7 Digits of Resident Registration No.
  [         ]-[    ]xxxxxx ech6b
  [Input Text         ] ⟳

ⓘ Check maximum allowance and increase to
  ₩500,000
☑ Agree to all terms
☑ Online Billing Service Terms and Conditions
☑ Collection and Use of Personal Information
☑ Online Billing Service Terms and Conditions of
  Mobile Carrier
☑ Disclosure of Personal Information to Third
  Parties
☑ The amount of mobile payment will be added
  to your cell phone bill next month.

[Cancel] [Send verification code>]

PRINTOUT DELIVERY SYSTEM AND METHOD USING MOBILE DEVICE

CROSS-REFERENCE TO RELATED APPLICATION

This application claims the benefit of Korean Patent Application No. 10-2016-0048168, filed on Apr. 20, 2016, in the Korean Intellectual Property Office, the disclosure of which is incorporated herein in its entirety by reference.

BACKGROUND

1. Field

One or more embodiments relate to a system and method for printing contents stored in a mobile device of a user, and delivering printouts to a receiver by using a delivery server.

2. Description of the Related Art

Image forming devices include individual devices such as printers, scanners, and facsimiles, and multi-function printers (MFPs) in which various functions of different devices are integrated into one device. Currently, such image forming devices include a wired communication module, e.g., an Ethernet module, or a wireless communication module, e.g., a Wireless Fidelity (Wi-Fi), Wi-Fi Direct, Near Field Communication (NFC), Bluetooth, Zigbee, or Infrared Data Association (IrDA) module, and thus may be connected to a cloud server and a user device such as a mobile device or a laptop computer through a network. In addition, contents stored in a mobile device may be rendered without using an image forming device driver by using a cloud server, and may be printed by using an image forming device connected to the cloud server.

SUMMARY

One or more embodiments include a system and method for printing contents stored in a mobile device of a user, and delivering printouts to a receiver by using a delivery server.

One or more embodiments include a non-transitory computer-readable recording medium having recorded thereon a computer program for executing the method.

Additional aspects will be set forth in part in the description which follows and, in part, will be apparent from the description, or may be learned by practice of the presented embodiments.

According to one or more embodiments, a method of transmitting contents stored in a mobile device includes displaying a list of the contents on a display screen, receiving a user input for selecting content to be printed, on the display screen, displaying a list of printers capable of printing the selected content, and a 'send to delivery server' item on the display screen, transmitting the content to a cloud server based on a user input for selecting the 'send to delivery server' item on the display screen, displaying a printing cost of the content on the display screen while the content is being converted into print data by the cloud server, receiving payment information of the printing cost and receiver information of a printout of the content, and transmitting the payment information and the receiver information to the cloud server.

According to one or more embodiments, a mobile device includes a communicator, a display, an input unit, a processor electrically connected to the communicator, the display, and the input unit, and a memory electrically connected to the processor, wherein, when the memory operates, the processor stores instructions for displaying a list of contents stored in the memory, on a display screen of the display, receiving a user input for selecting content, through the input unit, displaying a list of printers capable of printing the selected content, and a 'send to delivery server' item on the display screen, transmitting the content to a cloud server through the communicator based on a user input for selecting the 'send to delivery server' item on the display screen, displaying a printing cost of the content on the display screen while the content is being converted into print data by the cloud server, receiving payment information of the printing cost and receiver information of a printout of the content, and transmitting the payment information and the receiver information to the cloud server.

According to one or more embodiments, a method of transmitting contents by a cloud server includes receiving content transmitted from at least one mobile device, converting the content to a format corresponding to a delivery server and generating a converted content file, providing information about a printing cost of the content to the mobile device, receiving receiver information of a printout of the content from the mobile device, generating a print information file of the content based on the receiver information, and transmitting the print information file and the converted content file to the delivery server.

According to one or more embodiments, a non-transitory computer-readable recording medium has recorded thereon computer instructions for executing a method of transmitting contents by a mobile device, the method including displaying a list of the contents on a display screen, receiving a user input for selecting content to be printed, on the display screen, displaying a list of printers capable of printing the selected content, and a 'send to delivery server' item on the display screen, transmitting the content to a cloud server based on a user input for selecting the 'send to delivery server' item on the display screen, displaying a printing cost of the content on the display screen while the content is being converted into print data by the cloud server, receiving payment information of the printing cost and receiver information of a printout of the content, and transmitting the payment information and the receiver information to the cloud server.

According to one or more embodiments, a non-transitory computer-readable recording medium has recorded thereon computer instructions for executing a method of transmitting contents by a cloud server, the method including receiving content transmitted from at least one mobile device, converting the content to a format corresponding to a delivery server, providing information about a printing cost of the content to the mobile device, receiving receiver information of a printout of the content from the mobile device, generating print information of the content based on the receiver information, and transmitting the print information and the converted content to the delivery server.

According to one or more embodiments, a method of transmitting contents stored in a mobile device, to a delivery server includes displaying a list of the contents on a display screen, receiving a user input for selecting content to be printed, on the display screen, displaying a list of printers capable of printing the selected content, and a 'send to delivery server' item on the display screen, transmitting the content to a cloud server based on a user input for selecting the 'send to delivery server' item on the display screen, receiving the content from the cloud server, converting the content to a format corresponding to the delivery server and generating a converted content file, providing a screen image for requesting payment of a printing cost of the content, to the mobile device while the content is being converted, receiving payment information and receiver information of a printout of the content, from the mobile device, transmitting the payment information and the receiver information to the cloud server, generating a print information file of the content based on the receiver information by the cloud server, and transmitting the print information file and the converted content file to the delivery server.

BRIEF DESCRIPTION OF THE DRAWINGS

These and/or other aspects will become apparent and more readily appreciated from the following description of the embodiments, taken in conjunction with the accompanying drawings in which:

Figure 5D:
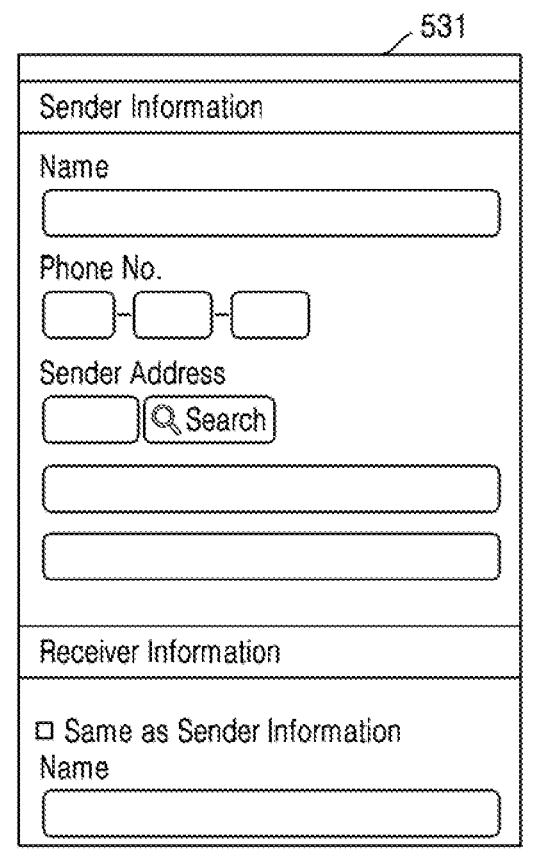
Figure 5E:
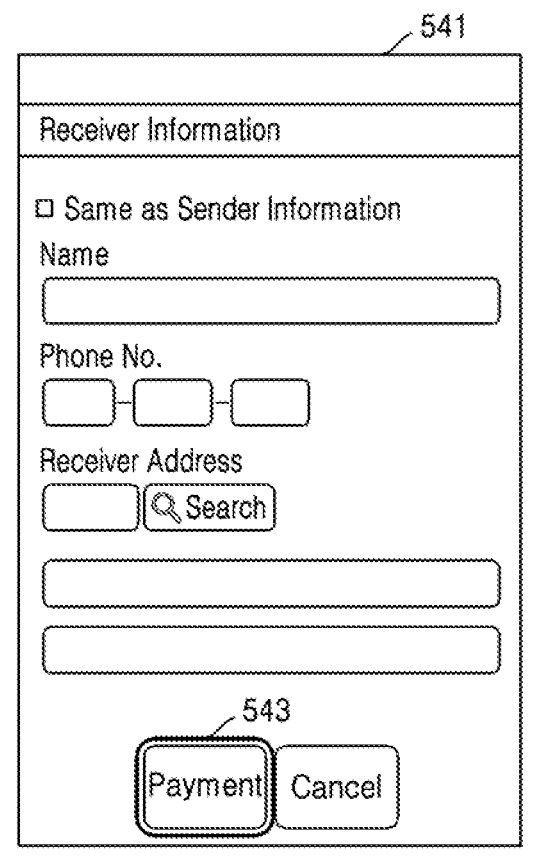

FIGS. 5A to 5H are graphic user interface (GUI) screen images of a mobile device, according to an embodiment;

DETAILED DESCRIPTION

Figure 1:
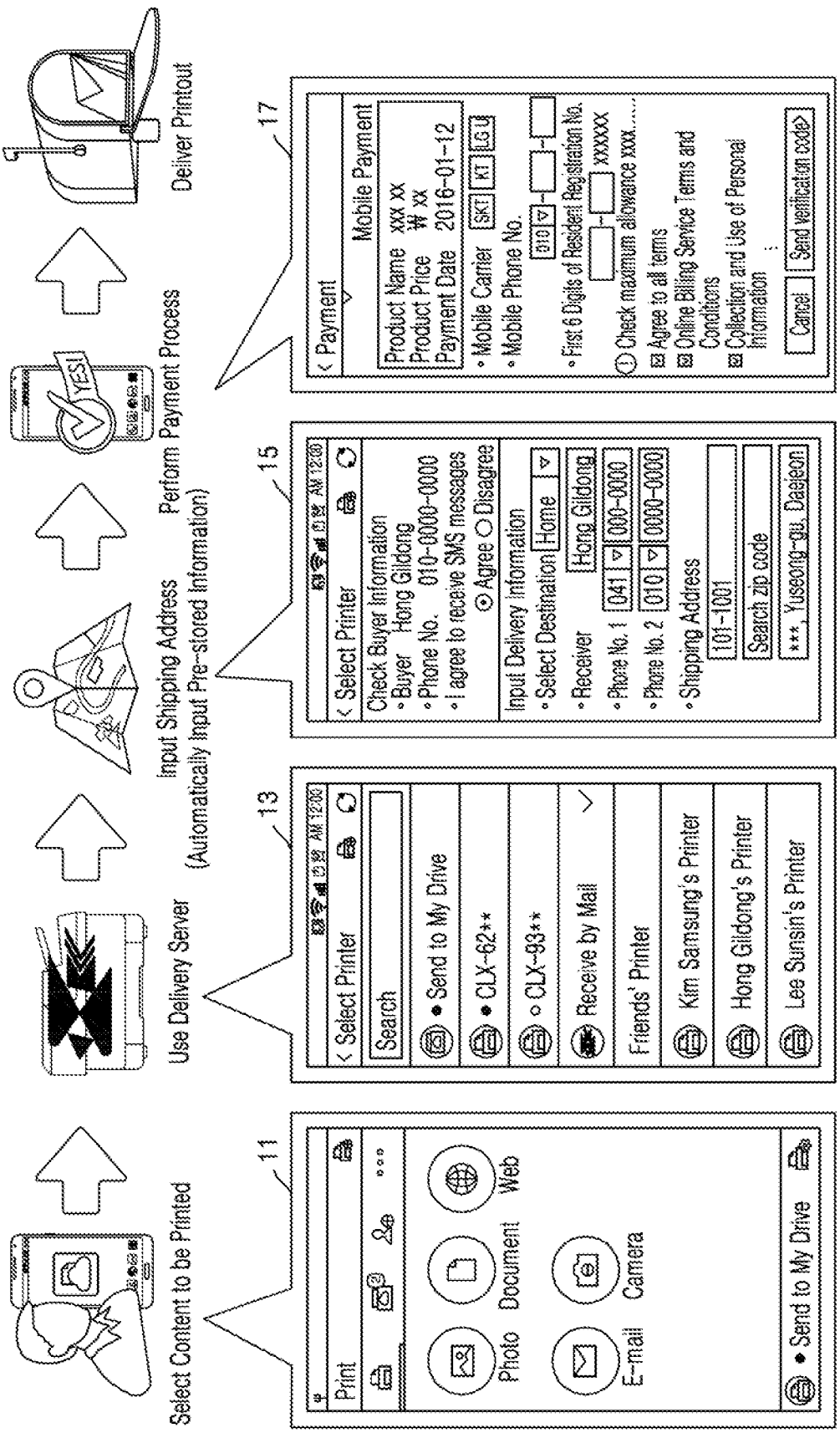
FIG. 1 is a diagram for describing printout delivery services using a delivery server, according to an embodiment.

Hereinafter, various embodiments will be described in detail with reference to the attached drawings.

The embodiments may, however, be embodied in many different forms and should not be construed as being limited to specific embodiments set forth herein; rather, these embodiments covers various modifications, equivalents and/or alternatives. In the drawings, like reference numerals denote like elements.

In this specification, the expression "include", "may include", "comprise", or "may comprise" indicates the presence of a feature (e.g., a numerical value, a function, an operation, or an element such as a part) and does not exclude the presence of an additional feature.

The expression "A or B", "at least one of A or/and B", or "one or more of A or/and B" may include all possible combinations of the listed items. For example, "A or B", "at least one of A and B", or "at least one of A or B" may refer to all cases in which (1) at least one A is included, (2) at least one B is included, and (3) at least one A and at least one B are both included.

The expressions such as "first", "second", "$1^{st}$" and "$2^{nd}$" used herein may refer to various different elements irrespective of the order and/or priority thereof, and are merely used to distinguish one element from another without limiting the elements. For example, "a first user device" and "a second user device" may indicate different user devices irrespective of the order or priority thereof. Specifically, a first element may be referred to as a second element and, similarly, a second element may be referred to as a first element without departing from the scope of the disclosure.

It will be understood that, when an element (e.g., a first element) is referred to as being "(operatively or communicatively) coupled with/to" or "connected to" another element (e.g., a second element), the element can be coupled or connected to the other element directly or through another element (e.g., a third element). On the contrary, it will be understood that, when an element (e.g., a first element) is referred to as being "directly coupled to" or "directly connected to" another element (e.g., a second element), another element (e.g., a third element) does not exist therebetween.

The expression "configured to" used herein may be interchangeably used with, for example, "suitable for", "having the capacity to", "designed to", "adapted to", "made to", or "capable of" as necessary. The term "configured to" does not always imply "specifically designed to" in a hardware manner. Rather, in some cases, the expression "a device configured to" may imply that the device is "capable of" something together with other devices or parts. For example, "a processor configured to perform A, B, and C" may imply a dedicated processor (e.g., an embedded processor) for performing the operations or a generic-purpose processor (e.g., a central processing unit (CPU) or an application processor) capable of performing the operations by executing one or more software programs stored in a memory device.

Terms used herein are used to describe specific embodiments, and are not intended to limit the scope of other embodiments. Singular forms are intended to include plural forms as well, unless the context clearly indicates otherwise. Unless defined differently, all terms used in the description including technical and scientific terms have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning. In some cases, even terms defined in this specification cannot be construed to exclude the embodiments.

An electronic device according to various embodiments may be, for example, a smartphone, a personal computer (PC), or a television (TV). However, the electronic device is not limited to the above-mentioned devices and may include new electronic devices based on development of technologies.

An electronic device according to various embodiments will now be described with reference to the attached drawings. In this specification, the term "user" may refer to a person who uses the electronic device or a device which uses the electronic device (e.g., an artificial intelligence (AI) electronic device).

FIG. 1 is a diagram for describing printout delivery services using a delivery server, according to an embodiment.

Referring to FIG. 1, a screen image 11 showing categories of contents may be displayed on a display of a mobile device. For example, 'photo', 'document', 'web', 'e-mail', and 'camera' items indicating the categories of the contents stored in memory may be displayed on the display of the mobile device. The mobile device may classify the contents into the categories to provide print data optimized for each category. When a user selects a category of contents, or content desired to be printed, a screen image 13 showing printers capable of printing the selected content, and a 'receive by mail' item may be displayed on the display. The 'receive by mail' item indicates to transmit print data to a delivery server of, for example, a post office or a parcel service provider, and a printing process may be performed via the delivery server. According to another embodiment, the delivery server may transmit the print data to a server of a printing company, and the printing process may be performed by the printing company. The delivery server may be a server for providing mail services or parcel services, and may classify and deliver mail or parcels.

When the user selects one of the displayed printers, the print data of the content stored in the mobile device may be transmitted to the selected printer and printed by the printer to produce a printout. For example, when the user selects a 'Lee Sunsin's printer' item, the content may be printed by Lee Sunsin's printer. Throughout this specification, the printout denotes paper on which the content has been printed.

When the user selects the 'receive by mail' item, a screen image 15 for inputting receiver information of the printout may be displayed on the display to deliver the printout. The receiver information may include a phone number and an address of a receiver. When the user completely inputs the receiver information, a screen image 17 for requesting payment may be displayed on the display.

According to another embodiment, information pre-stored by the user may be automatically input as the receiver information.

The screen image 17 for requesting payment may be transmitted from a cloud server. Payment information input by the user may be transmitted via the cloud server to a payment server. When a payment process is completed, the print data may be transmitted via the cloud server to the delivery server and the printout may be delivered to the receiver.

Figure 2:
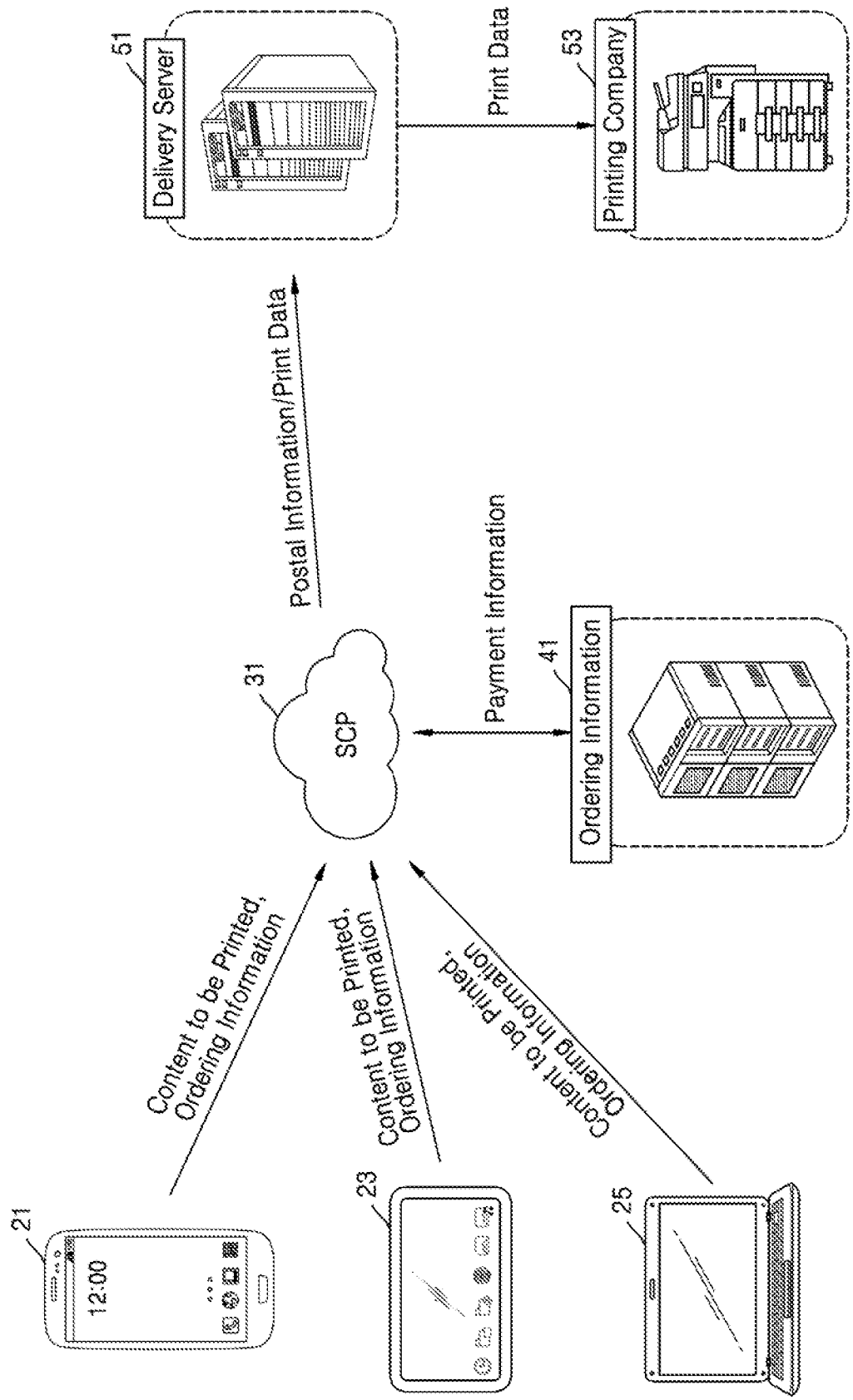
FIG. 2 is a schematic diagram of a printout delivery service providing system using a delivery server, according to an embodiment.

FIG. 2 is a schematic diagram of a printout delivery service providing system using a delivery server 51, according to an embodiment.

Referring to FIG. 2, a smartphone 21, a tablet 23, a laptop computer 25, a cloud server 31, a payment server 41, the delivery server 51, and a printing company server 53 are illustrated. The smartphone 21, the tablet 23, and the laptop computer 25 may be mobile devices. The mobile devices may have a mobile communication function and are not limited to the above-mentioned devices. The mobile devices use a well-known mobile communication technology such as second generation (2G) mobile communication, third generation (3G) mobile communication, or fourth generation (4G) mobile communication, and have a phone call function.

In particular, a unique phone number is assigned to each of portable mobile devices such as smartphones or tablet devices by mobile carriers, and thus the portable mobile devices are identified.

The cloud server 31 may manage content transmitted from the mobile device 21, 23, or 25 and render the content to a print data format or convert the content to a format corresponding to the delivery server 51. The cloud server 31 may receive contents of various formats and convert the contents to the format corresponding to the delivery server 51. Since the delivery server 51 may support only a certain format, the cloud server 31 should convert the content transmitted from the mobile device 21, 23, or 25, to the format corresponding to the delivery server 51. For example, when the delivery server 51 supports only a portable document format (pdf), the cloud server 31 converts the content transmitted from the mobile device 21, 23, or 25, to the pdf format, and transmits the converted content to the delivery server 51. The content transmitted from the mobile device 21, 23, or 25 may include, for example, a photo, a document, or a webpage. The cloud server 31 may convert the content transmitted from the mobile device 21, 23, or 25, to the pdf format irrespective of the category of the content, and transmit the converted content to the delivery server 51. The content converted to the pdf format may be print data.

When the cloud server 31 converts the content transmitted from the mobile device 21, 23, or 25, to the pdf format and transmits the converted content to the delivery server 51, the cloud server 31 may collect and transmit the print data at one time in a certain time cycle. For example, the cloud server 31 may transmit the print data to the delivery server 51 once every ten minutes. That is, the cloud server 31 may collect the print data accumulated for ten minutes and transmit the collected print data to the delivery server 51 at one time.

The cloud server 31 may convert the content transmitted from the mobile device 21, 23, or 25, into the print data (pdf format) and generate the print data as a file. In this case, a name of the file may include, for example, information about a time when the file is generated.

The cloud server 31 transmits the generated print data file and a print information file of the print data file, to the delivery server 51. The print information file may include sender (user) information and receiver information. The sender information may include a phone number and an address of a sender of a printout. When the printout is delivered by mail, the sender information may be necessary to return the printout. The receiver information may include a phone number and an address of a receiver of the printout. The delivery server 51 may make the printout delivered to the address of the receiver, with reference to the print information file. One print information file may be generated for each print data file, but the print information file is not limited thereto. The print information file may include information about the print data file (e.g., a print data file name).

The payment server 41 may receive payment information required to pay a cost of producing the printout, from the user and perform a payment process. When the user selects a 'send by mail' item, the payment server 41 may generate a screen image for requesting payment information and transmit the screen image via the cloud server 31 to the mobile device 21, 23, or 25 to display the payment information on a display of the mobile device 21, 23, or 25. The payment server 41 may perform the payment process by using the payment information transmitted from the mobile device 21, 23, or 25. When the payment process is completed, the payment server 41 may transmit payment completion information to the cloud server 31 such that the cloud server 31 may transmit the print data to the delivery server 51.

The delivery server 51 obtains the printout by printing the print data transmitted from the cloud server 31. Alternatively, the delivery server 51 may transmit the print data to the printing company server 53 and the printing company server 53 may produce the printout by using the print data.

Figure 3:
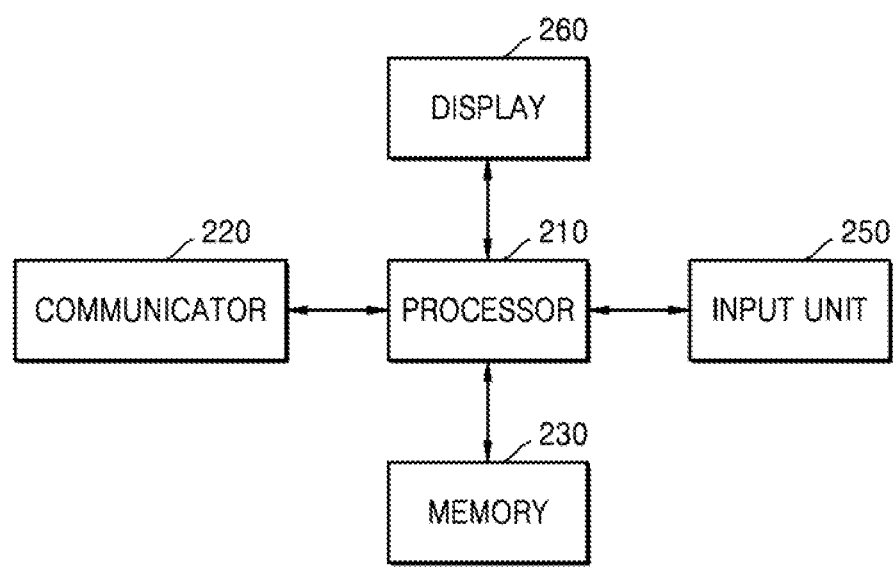
FIG. 3 is a block diagram of a mobile device of a system according to an embodiment.

FIG. 3 is a block diagram of a mobile device of a system according to an embodiment.

Referring to FIG. 3, the mobile device includes a processor 210, a communicator 220, a memory 230, an input unit 250, and a display 260. In FIG. 3, descriptions are given of only hardware components related to the current embodiment to avoid making technical features of the current embodiment unclear. It will be understood by one of ordinary skill in the art that the mobile device may further include generic-purpose hardware components other than the hardware components illustrated in FIG. 3.

The processor 210 is a hardware component for controlling overall operations and functions of the mobile device. The processor 210 may, for example, control one or more other components of the mobile device and/or perform communication-related operation or data processing.

In particular, the processor 210 may be electrically connected to the communicator 220, the display 260, the input unit 250, and the memory 230 to display content to be printed, on the display 260 by loading an instruction stored in the memory 230, to receive a user input for selecting the content to be printed, through the input unit 250, to display a list of printers and a delivery server capable of printing the selected content, on the display 260, to transmit the content through the communicator to a cloud server based on a user input for selecting the delivery server on the display 260, to display a printing cost of the content on the display 260, and to display a screen image for inputting sender information about a sender who transmits the content and receiver information about a receiver who receives a printout of the content, on the display 260.

The memory 230 may include a volatile memory and/or a non-volatile memory. The memory 230 may store, for example, instructions or data related to one or more other components of the mobile device. According to an embodiment, the memory 230 may store software and/or programs.

The display 260 may include, for example, a liquid crystal display (LCD), a light-emitting diode (LED) display, an organic light-emitting diode (OLED) display, a microelectromechanical system (MEMS) display, or an electronic paper display. The display 260 may display, for example, various contents (e.g., text, images, videos, icons, and/or symbols) to a user. The display 260 may include a touch screen and receive, for example, touch, gesture, proximity, or hovering inputs using an electronic pen or a body part of the user.

The communicator 220 may establish communication between, for example, the mobile device and an external device or a server. For example, the communicator 220 may be connected to a network through wireless communication or wired communication to communicate with the external device or the server.

The wireless communication may include, for example, cellular communication using at least one of Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to an embodiment, the wireless communication may include at least one of, for example, Wireless Fidelity (Wi-Fi), Bluetooth, Bluetooth Low Energy (BLE), Zigbee, Near Field Communication (NFC), Magnetic Secure Transmission, Radio Frequency (RF), and Body Area Network (BAN).

The wired communication may include at least one of, for example, Universal Serial Bus (USB), High Definition Multimedia Interface (HDMI), Recommended Standard 232 (RS-232), Power Line Communication, and Plain Old Telephone Service (POTS). The network may include a telecommunications network including at least one of, for example, a computer network (e.g., a local area network (LAN) or a wide area network (WAN)), the Internet, and a telephone network.

According to various embodiments, some or all operations performed by the mobile device may be performed by the server. According to an embodiment, when the mobile device should perform certain functions or services automatically or based on a request, instead of or in addition to autonomously performing the functions or services, the mobile device may request the server to perform at least some functions related thereto. The server may perform the requested functions or additional functions, and transmit results thereof to the mobile device. The mobile device may provide the requested functions or services by using or by additionally processing the received results. To this end, for example, cloud computing, distributed computing, or client-server computing may be used.

Figure 4:
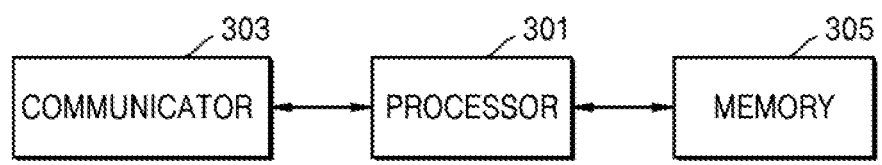
FIG. 4 is a block diagram of a cloud server of a system according to an embodiment.
Figure 5A:
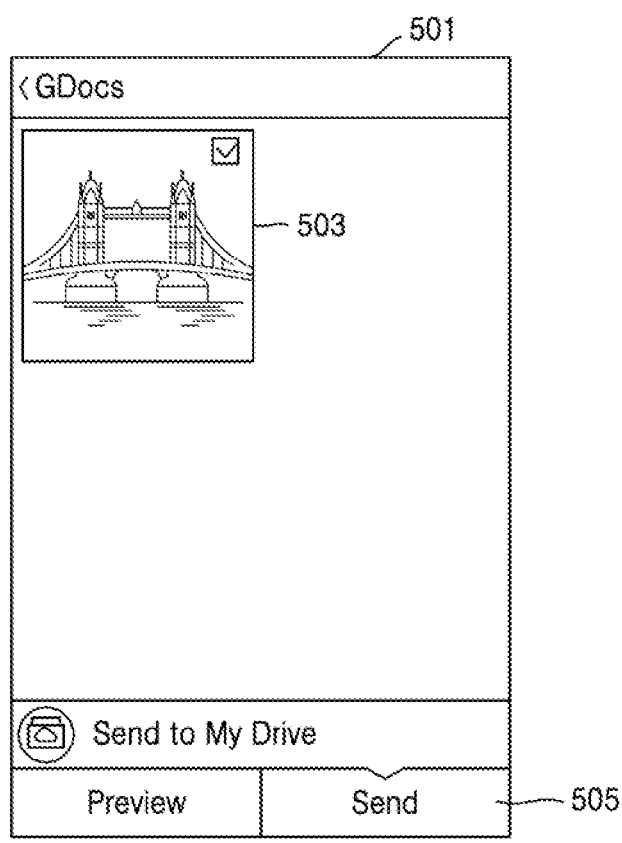
Figure 5B:
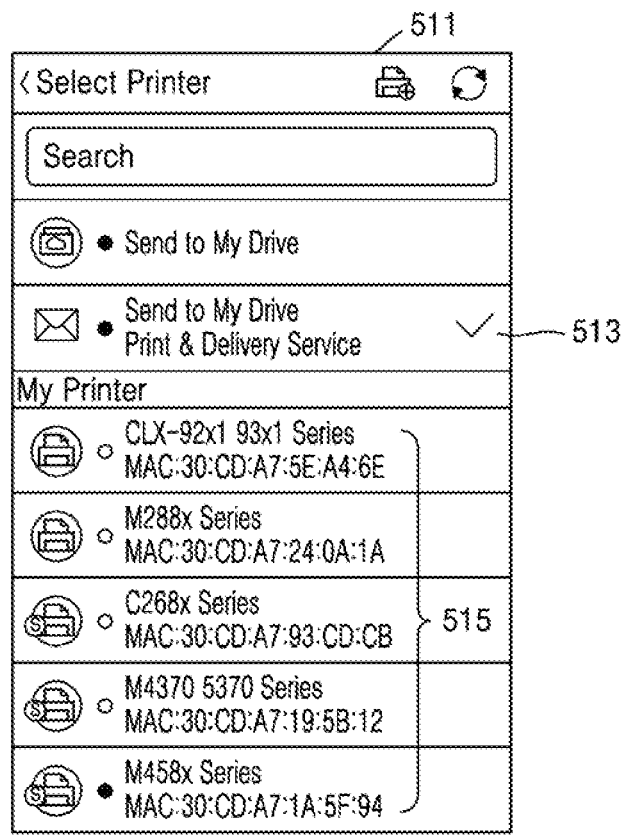
Figure 5C:
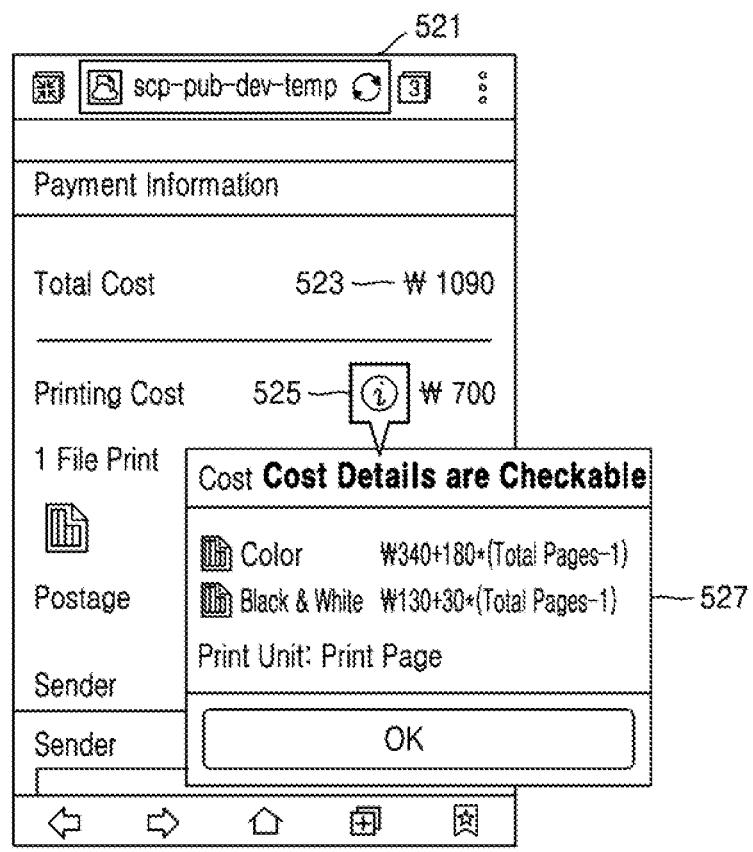
Figure 5G:
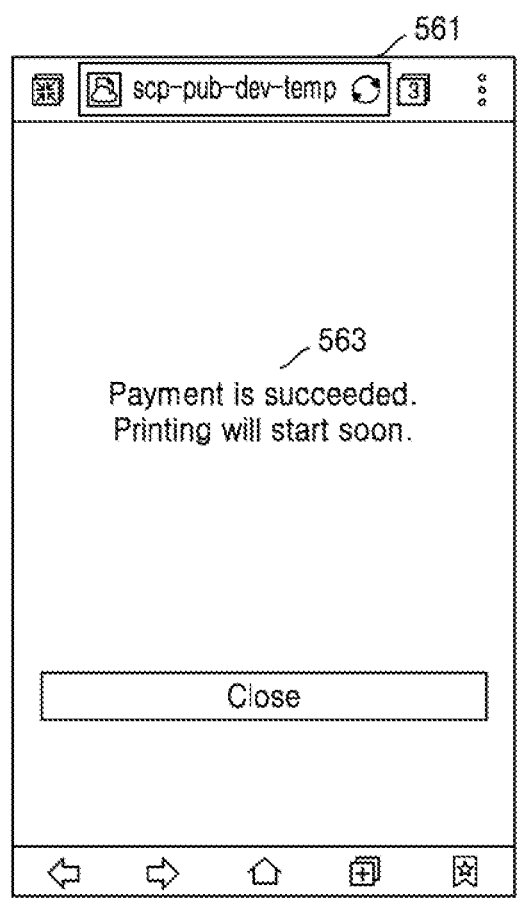
Figure 5H:
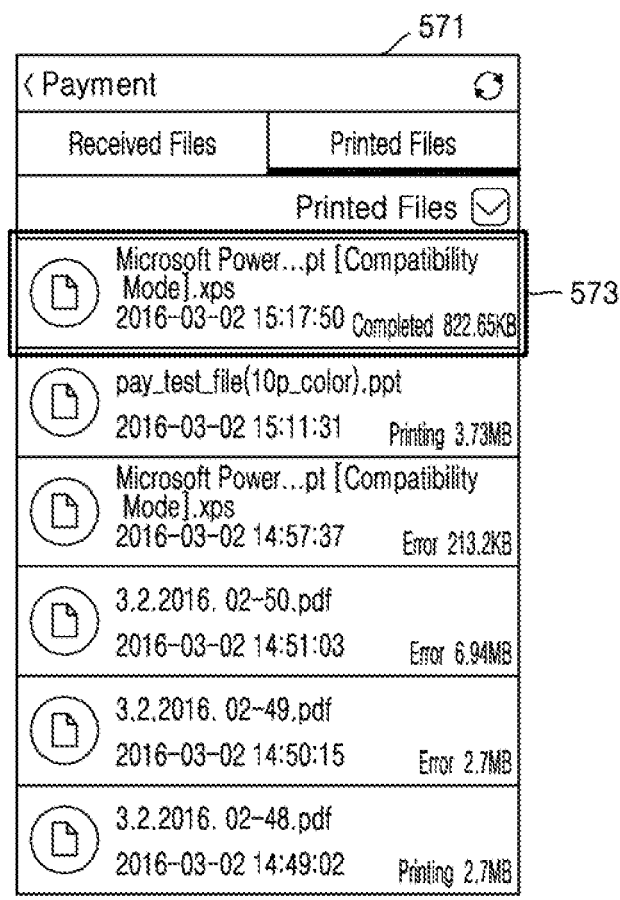

FIG. 4 is a block diagram of a cloud server of a system according to an embodiment.

Referring to FIG. 4, the cloud server may include a processor 301, a communicator 303, and a memory 305. Operations and functions of the communicator 303 and the memory 305 are the same as those of the components of the mobile device described above in relation to FIG. 3, and thus detailed descriptions thereof are not provided herein.

The processor 301 may receive content transmitted from a mobile device, render the content, i.e., convert the content to a format corresponding to a delivery server, provide information about a printing cost of the content, to the mobile device, receive sender information and receiver information of a printout of the content from the mobile device, generate print information of the content based on the sender information and the receiver information, and transmit the print information and the converted content to the delivery server.

FIGS. 5A to 5H are graphic user interface (GUI) screen images of a mobile device, according to an embodiment.

Figure 6:
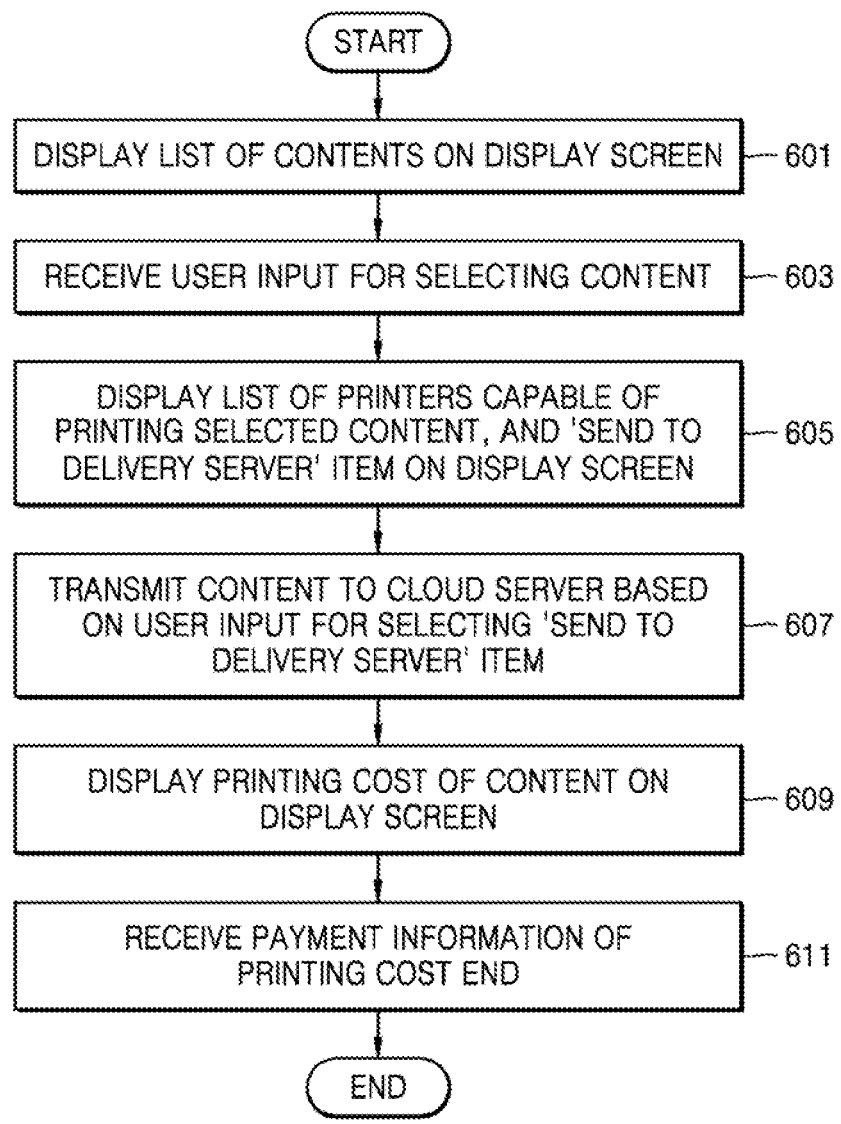
FIG. 6 is a flowchart of a process of selecting content to be printed and transmitting the content to a cloud server by the mobile device, according to an embodiment.

FIG. 6 is a flowchart of a process of selecting content to be printed and transmitting the content to a cloud server by the mobile device, according to an embodiment.

Referring to FIGS. 5A to 5H, and 6, a mobile device displays a screen image 501 on a display in operation 601. The screen image 501 may include a list of contents or thumbnail images corresponding to the contents. When a user selects content 503 to be printed, on the screen image 501, the content 503 may be visually distinguishably displayed. For example, the selected content 503 may be displayed with a different color or with a check mark. When the user selects the content 503 to be printed and touches a send button 505 shown on the screen image 501, a screen image 511 is displayed on the display.

The mobile device may display a printer item for selecting a printer to perform a printing process, and a 'send to post office' item 513 on the display in operation 603. The screen image 511 may include a list of printers 515 capable of printing the content, and the 'send to post office' item 513.

When the user selects one of the printers 515 shown on the screen image 511, print data of the content may be transmitted to the selected printer. The mobile device may transmit the content to the cloud server based on a user input for selecting a delivery server, in operation 607.

The mobile device may display a printing cost of the content on the display in operation 609. For example, when the user selects the 'send to post office' item 513 on the screen image 511, a screen image 521 may be displayed on the display. The screen image 521 may show a total cost 523 and an icon 525 capable of showing details about the printing cost. When the user touches the icon 525, details 527 about the printing cost may be displayed on the display. The details 527 about the printing cost may distinguishably show printing costs per page for color printing and black-and-white printing.

According to another embodiment, the screen image 521 may show a menu for selecting one of delivery speeds, and charges corresponding thereto. To select the delivery speed, in the case of, for example, mail delivery, a 'standard mail' item and an 'express mail' item, and charges corresponding thereto may be shown on the screen image 521. According to another embodiment, charges differently set based on distances to destinations may be shown on the screen image 521.

When the user inputs payment information, a screen image 531 may be displayed. The screen image 531 may be a screen image for inputting sender information. For example, the sender information may include a name, a phone number, and an address of a sender of a printout. When the sender information is input, the mobile device may display a screen image 541 for inputting receiver information, on the display. The receiver information may include a name, a phone number, and an address of a receiver of the printout.

When the user inputs the receiver information and touches a payment button 543, the mobile device may display a screen image 551 for requesting payment, on the display. The screen image 551 for requesting payment may be provided from a payment server to the cloud server, and the cloud server may transmit the screen image 551 to the mobile device. The mobile device receives payment information of the printing cost, and transmits the payment information via the cloud server to the payment server, in operation 611. The payment server performs a payment process by using the payment information transmitted from the mobile device. The screen image 551 for payment may include a graphic object for inputting a phone number of the user. When the payment process is completed, the mobile device may display a screen image 561 including a message 563 indicating that the payment process is completed, on the display. In addition, the mobile device may display a screen image 571 including print status information indicating whether printing was completed, on the display.

While the sender information, the receiver information, and the payment information are being input, the cloud server converts the content transmitted from the mobile device, to a format corresponding to the delivery server. For example, while the payment information and printout delivery information are being input on the mobile device, the cloud server may convert the content transmitted from the mobile device, to a pdf format, and generate the converted content as a file. When a payment process is completed by using the mobile device, the mobile device may display print data information 573 (e.g., a print data file name) of the content on the display in association with the cloud server.

Figure 7:
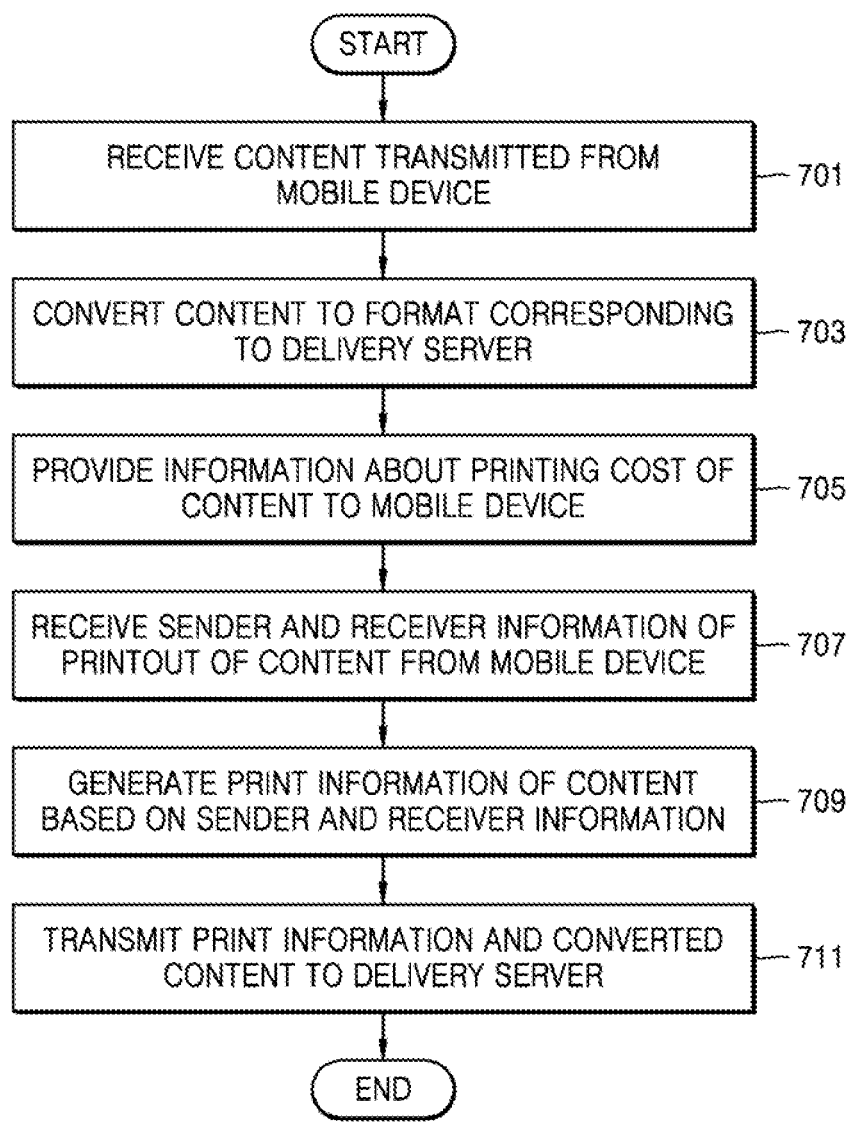
FIG. 7 is a flowchart of a process of generating print data and transmitting the print data to a delivery server by a server, according to an embodiment.

FIG. 7 is a flowchart of a process of generating print data and transmitting the print data to a delivery server by a cloud server, according to an embodiment.

Referring to FIG. 7, the cloud server receives content transmitted from a mobile device, in operation 701. The cloud server may receive the content from a plurality of mobile devices. The cloud server may convert the content to a format corresponding to the delivery server, in operation 703. The content transmitted from the mobile device may have various formats. For example, the formats may include image formats, text formats, and html formats. The cloud server may convert the content transmitted from the mobile device and having various formats, to a pdf format corresponding to the delivery server, generate the converted content as a file, and provide a file name.

The cloud server may provide information about a printing cost of the content to the mobile device in operation 705. The cloud server may receive payment information from a payment gateway and provide the payment information to the mobile device. According to another embodiment, the cloud server may autonomously generate and provide the payment information to the mobile device irrespective of the payment gateway. The payment information may include detailed information about the printing cost. For example, information about a printing cost per page, a black-and-while printing cost, and a color printing cost may be distinguishably displayed.

The cloud server may receive sender information and receiver information of a printout of the content in operation 707. The sender information may include a name, a phone number, and an address of a sender. The receiver information may include a name, a phone number, and an address of a receiver.

The cloud server may generate print information of the content based on the sender information and the receiver information input on the mobile device by a user, in operation 709. The print information of the content may include the sender information, the receiver information, and the file name of the print data.

The cloud server may transmit the print information generated in operation 709, and the converted content to the delivery server in operation 711. The converted content may be the print data and may be generated as an individual file provided with a file name. The print information may include the file name of the converted content, and the delivery server may search for data to be printed, by using the file name included in the print information.

Figure 8:
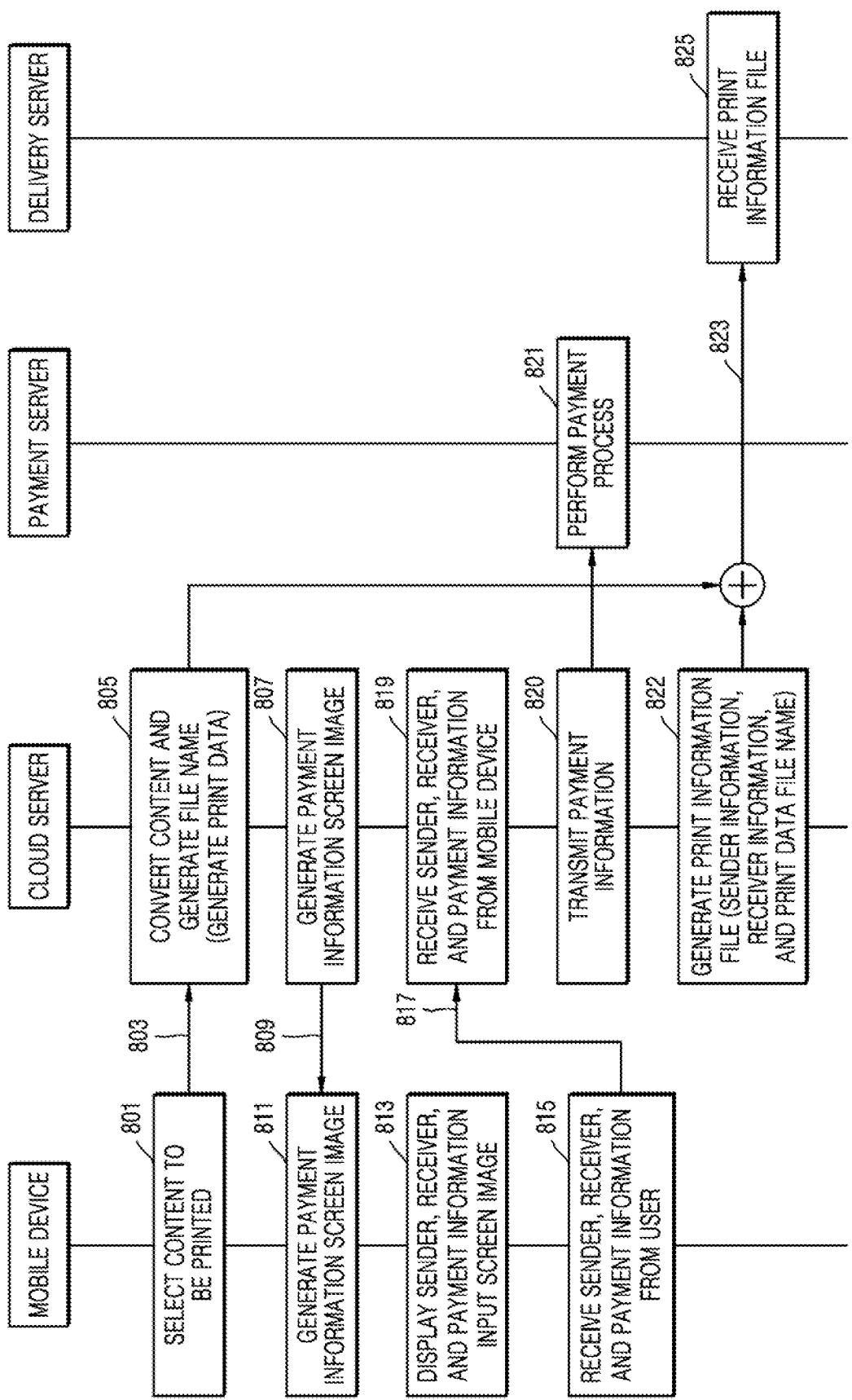
FIG. 8 is a diagram for describing a process of converting content stored in a mobile device, into print data and transmitting the print data to a delivery server by a cloud server.

FIG. 8 is a diagram for describing a process of converting content selected on a mobile device, into print data and transmitting the print data to a delivery server by a cloud server.

When content to be printed is selected (operation 801), the mobile device transmits the content to the cloud server (operation 803). The cloud server converts the received content to a format corresponding to the delivery server, and generates the converted content as a file (operation 805). That is, the cloud server converts the received content into print data and generates the print data as a file. The generated file may be transmitted to the delivery server together with a print information file in operation 823.

While the cloud server is converting the content into the print data, a payment process may be performed by using the mobile device.

The cloud server generates a payment information screen image (operation 807), and transmits the payment information screen image to the mobile device (operation 809). The mobile device displays the payment information screen image on a display (operation 811). According to another embodiment, the payment information screen image may be transmitted from a payment server.

The mobile device displays a sender information and receiver information input screen image on the display (operation 813), and receives sender information and receiver information from a user (operation 815). The mobile device transmits the sender information and the receiver information to the cloud server (operation 817), and the cloud server receives the sender information and the receiver information (operation 819). The cloud server transmits payment information to the payment server (operation 820), and the payment server performs a payment process (operation 821). To perform the payment process, the payment server may transmit a payment confirmation request screen image via the cloud server to the mobile device, and the user may input payment confirmation information on the display of the mobile device, thereby completing the payment process. When the payment process is completed, the cloud server generates a print information file by using the sender information and the receiver information transmitted from the mobile device, and a name of the print data file generated in operation 805 (in operation 822). That is, the print information file may include the sender information, the receiver information, and the print data file name. The cloud server transmits the print information file generated in operation 822 and the print data file generated in operation 805, to the delivery server (operation 823).

The delivery server receives the print information file (operation 825), obtains the print data file with reference to the print data file name included in the print information file, and transmits the print data file to a printing company to produce a printout. The produced printout may be delivered to a receiver indicated by the receiver information included in the print information file.

Figure 9:
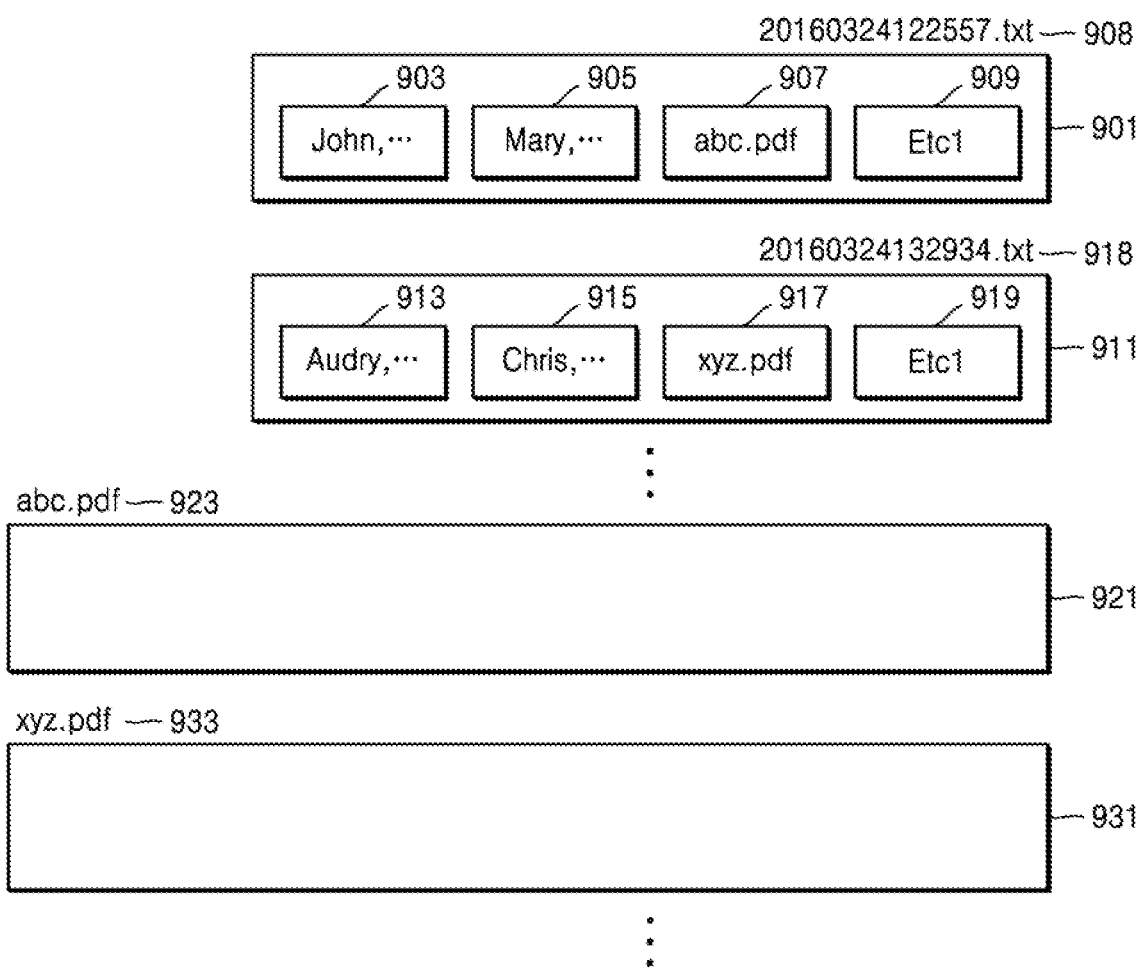
FIG. 9 is a diagram showing examples of mail information files generated by a cloud server.

FIG. 9 is a diagram showing examples of mail information files generated by a cloud server.

Referring to FIG. 9, print information files 901 and 911, and print data files 921 and 931 are illustrated.

The print information files 901 and 911 may include sender information 903 and 913, receiver information 905 and 915, print data file names 907 and 917, and other information 909 and 919. The other information 909 and 919 may include, for example, dates when the print information files 901 and 911 are generated.

The cloud server may generate the print information files 901 and 911 and provide file names 908 and 918 to the generated print information files 901 and 911. The file names 908 and 918 may be provided by using, for example, dates and times when the print information files 901 and 911 are generated. The print information files 901 and 911 may be text-format files. For example, the print information file 901 may be a text file in which the sender information 903, the receiver information 905, the print data file name 907, and the other information 909 are separated by pre-defined separators.

The print data files 921 and 931 are files obtained by converting contents transmitted from a mobile device, to a format corresponding to a delivery server. For example, the print data files 921 and 931 may be pdf-format files 923 and 933.

According to the above description, since contents stored in a mobile device such as a smartphone or a tablet may be transmitted to a cloud server and the cloud server may print the contents and deliver printouts to a receiver by using a delivery server, even when a user does not have a printer, the user may obtain desired printouts and make the printouts delivered to a desired receiver. In particular, since contents to be printed may be easily selected and a payment process may be easily performed by using the mobile device, printouts of desired contents may be delivered to a desired receiver without restrictions in time and space.

Meanwhile, the afore-described embodiments can be written as computer programs and can be implemented in general-use digital computers that execute the programs using a non-transitory computer-readable recording medium. Also, the data structure used in the embodiments can be recorded on a non-transitory computer-readable recording medium via various means. Examples of the non-transitory computer-readable recording medium include magnetic storage media (e.g., ROM, floppy disks, hard disks, etc.), optical recording media (e.g., CD-ROMs, or DVDs), etc.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method, comprising:

executing, by at least one processor included in the mobile device, instructions stored in at least one memory, to cause the mobile device to perform the following operations:

displaying, on a display screen of the mobile device, a list of contents stored for the mobile device;

operating to receive a user input to the mobile device selecting a content from the list of contents displayed on the display screen;

displaying, on the display screen, selectable information indicating printing of the content and delivery of the printed content; and in response to receiving a user input selecting the selectable information, transmitting the selected content to a server to cause the server to, convert the selected content into a printable format corresponding to a delivery server, generate print information corresponding to the converted content, and transmit the converted content in the printable format and the generated print information to the delivery server operable to process the printing and delivery of the printed content; and communicating with the server, while the selected content is being converted by the server, to initiate a process that includes, displaying, on the display screen, a printing cost of the selected content, receiving, by the mobile device, a user input indicating payment information for the printing cost, sender information about a sender for the printing and delivery of the printed content, and receiver information about a receiver for the printing and delivery of the printed content, and transmitting the payment information, the sender information, and the receiver information to the server to cause the server to, generate the print information based on the sender and receiver information, and transmit the print information and the converted content to the delivery server operable to process the printing and delivery of the printed content to the receiver.

2. The method of claim 1, wherein the receiver information comprises an address of the receiver.

3. The method of claim 1, wherein the operations further include:

displaying, on the display screen, a message indicating a payment process with respect to the payment information is completed, and information indicating a status of the printing.

4. The method of claim 1, wherein the operations further include:
operating to receive, by the mobile device, a user input for requesting details about the printing cost while the printing cost is being displayed on the display screen, and
displaying, on the display screen, the details in response to receiving the user input for requesting details.

5. A mobile device comprising:
a display including a display screen;
at least one memory storing instructions; and
at least one processor that couples to the at least one memory and that executes instructions to cause the mobile device to perform the following operations:
displaying, on the display screen, a list of contents stored for the mobile device;
operating to receive a user input to the mobile device selecting a content from the list of contents displayed on the display screen;
displaying, on the display screen, selectable information indicating printing of the content and delivery of the printed content; and
in response to receiving a user input selecting the selectable information,
transmitting the selected content to a server to cause the server to,
convert the selected content into a printable format corresponding to a delivery server,
generate print information corresponding to the converted content, and
transmit the converted content in the printable format and the generated print information to the delivery server operable to process the printing and delivery of the printed content; and
communicating with the server, while the selected content is being converted by the server, to initiate a process that includes,
displaying, on the display screen, a printing cost of the selected content, and
receiving, by the mobile device, a user input indicating payment information for the printing cost, sender information about a sender for the printing and delivery of the printed content, and receiver information about a receiver for the printing and delivery of the printed content, and
transmitting the payment information, the sender information, and the receiver information to the server to cause the server to,
generate the print information based on the sender and receiver information, and
transmit the print information and the converted content to the delivery server operable to process the printing and delivery of the printed content to the receiver.

6. The mobile device of claim 5, wherein the receiver information comprises an address of the receiver.

7. The mobile device of claim 5, wherein the operations further include: displaying, on the display screen, a message indicating a payment process with respect to the payment information is completed, and information indicating a status of the printing.

8. The mobile device of claim 5, wherein the operations further include:
operating to receive a user input for requesting details about the printing cost while the printing cost is being displayed on the display screen, and
displaying, on the display screen, the details in response to receiving the user input for requesting details.

9. A method, comprising:
by a mobile device,
displaying a list of contents stored for the mobile device;
displaying selectable information indicating printing of a content among the displayed list of contents and delivery of the printed content, resulting from a selection of the content from the displayed list of contents; and
in response to receiving a user input selecting the selectable information,
transmitting the selected content to a server to cause the server to convert the selected content into a printable format corresponding to a delivery server, and
communicating with the server, while the selected content is being converted by the server, to initiate a process that includes,
displaying a printing cost of the selected content, and
obtaining, based on a user input, payment information for the printing cost, sender information about a sender for the printing and delivery of the printed content, and receiver information about a receiver for the printing and delivery of the printed content, and
transmitting the payment information, the sender information, and the receiver information to the server to cause the server to,
generate the print information based on the sender and receiver information, and
transmit the print information and the converted content to the delivery server operable to process the printing and delivery of the printed content to the receiver; and
by the server,
receiving the content transmitted from the mobile device;
converting the received content to the printable format corresponding to the delivery server operable to print the content and provide the service for delivery of the printed content;
communicating with the mobile device, while the content is being converted by the server, to initiate the process that includes,
providing, to the mobile device, information about the printing cost of the content, and
receiving, from the mobile device, the payment information, the sender information, and the receiver information, based on the user input;
generating the print information based on the received sender and receiver information; and
transmitting the print information and the converted content to the delivery server operable to process the printing and delivery of the printed content to the receiver.

10. The method of claim 9, wherein the print information file comprises a name of a file of the converted content.

11. The method of claim 9, wherein the receiver information comprises an address of the receiver.

12. The method of claim 10, wherein the receiver information and the name of the file of the converted content comprised in the print information file are separated by a separator.

13. The method of claim 9, wherein the receiving the payment information includes:
providing a screen image for requesting payment of the printing cost, to the mobile device.

14. The method of claim 9, wherein the transmitting comprises transmitting plural print information and corresponding plural converted contents in a certain time cycle.

15. A non-transitory computer-readable recording medium having recorded thereon computer instructions that, when executed by at least one processor included in a mobile device, cause the mobile device to perform the following operations:
displaying, on a display screen of the mobile device, a list of contents stored for the mobile device;
operating to receive a user input to the mobile device selecting a content from the list of contents displayed on the display screen;
displaying, on the display screen, selectable information indicating printing of the content and delivery of the printed content; and
in response to receiving a user input selecting the selectable information,
transmitting the selected content to a server to cause the server to,
convert the selected content into a printable format corresponding to a delivery server,
generate print information corresponding to the converted content, and
transmit the converted content in the printable format and the generated print information to the delivery server operable to process the printing and delivery of the printed content; and
communicating with the server, while the selected content is being converted by the server, to initiate a process that includes,
displaying, on the display screen, a printing cost of the selected content,
receiving, by the mobile device, a user input indicating payment information for the printing cost, sender information about a sender for the printing and delivery of the printed content, and receiver information about a receiver for the printing and delivery of the printed content, and
transmitting the payment information, the sender information and the receiver information to the server to cause the server to,
generate the print information based on the sender and receiver information, and
transmit the print information and the converted content to the delivery server operable to process the printing and delivery of the printed content to the receiver.

16. A non-transitory computer-readable recording medium having recorded thereon computer instructions that, when executed by a mobile device and a server, cause the mobile device and the server to perform:
displaying, by the mobile device, a list of contents stored for the mobile device;
displaying, by the mobile device, selectable information indicating printing of a content among the displayed list of contents and delivery of the printed content, resulting from a selection of the content from the displayed list of contents;
in response to receiving a user input selecting the selectable information, the mobile device, is to,
transmit the selected content to a server to cause the server to convert the selected content into a printable format corresponding to a delivery server, and
communicate with the server, while the selected content is being converted by the server, to initiate a process that includes,
displaying a printing cost of the selected content, and
obtaining, based on a user input, payment information for the printing cost, sender information about a sender for the printing and delivery of the printed content, and receiver information about a receiver for the printing and delivery of the printed content, and
transmitting the payment information, the sender information, and the receiver information to the server to cause the server to,
generate the print information based on the sender and receiver information, and
transmit the print information and the converted content to the delivery server operable to process the printing and delivery of the printed content to the receiver;
receiving, by the server, the content transmitted from the mobile device;
converting, by the server, the received content to a printable format corresponding to the delivery server operable to print the content and provide the service for delivery of the printed content;
communicating, by the server, with the mobile device, while the content is being converted by the server, to initiate the process that includes,
providing, to the mobile device, information about the printing cost of the content, and
receiving, from the mobile device, the payment information, the sender information, and the receiver information;
generating, by the server, the print information based on the received sender and receiver information; and
transmitting, by the server, the print information and the converted content to the delivery server operable to process the printing and delivery of the printed content to the receiver.

* * * * *